United States Patent [19]

Unnewehr et al.

[11] Patent Number: 4,496,897
[45] Date of Patent: Jan. 29, 1985

[54] VARIABLE VOLTAGE CONTROL FOR SELF-EXCITED SELF-REGULATED SYNCHRONOUS ALTERNATOR

[75] Inventors: Lewis E. Unnewehr; Robert B. Walker; Andrew F. Szippl, all of Lima, Ohio

[73] Assignee: Lima Electric Co., Inc., Lima, Ohio

[21] Appl. No.: 320,723

[22] Filed: Nov. 12, 1981

[51] Int. Cl.³ .............................................. H02P 9/30
[52] U.S. Cl. .................................. 322/25; 322/27; 322/28; 322/73
[58] Field of Search ............... 322/25, 28, 59, 27, 322/60, 21, 72, 73

[56] References Cited

U.S. PATENT DOCUMENTS

| | | | |
|---|---|---|---|
| 3,486,106 | 12/1969 | Dietl | 322/25 |
| 3,596,169 | 7/1971 | Snedecker | 322/27 |
| 3,758,843 | 9/1973 | Ishizaki et al. | 322/25 |
| 4,152,636 | 5/1979 | Gorden | 322/25 |

*Primary Examiner*—R. J. Hickey
*Attorney, Agent, or Firm*—Maky, Renner, Otto & Boisselle

[57] ABSTRACT

An electric generating device of the self-excited, self-regulated, brushless, synchronous type includes an alternator-exciter for producing an electrical output and an adjusting means for adjusting or setting the output voltage of the alternator-exciter substantially independently of the winding arrangement thereof to control the no-load or light load voltage of the electrical output. A deactivating device deactivates the adjusting control when maximum field current is demanded by a load.

16 Claims, 3 Drawing Figures

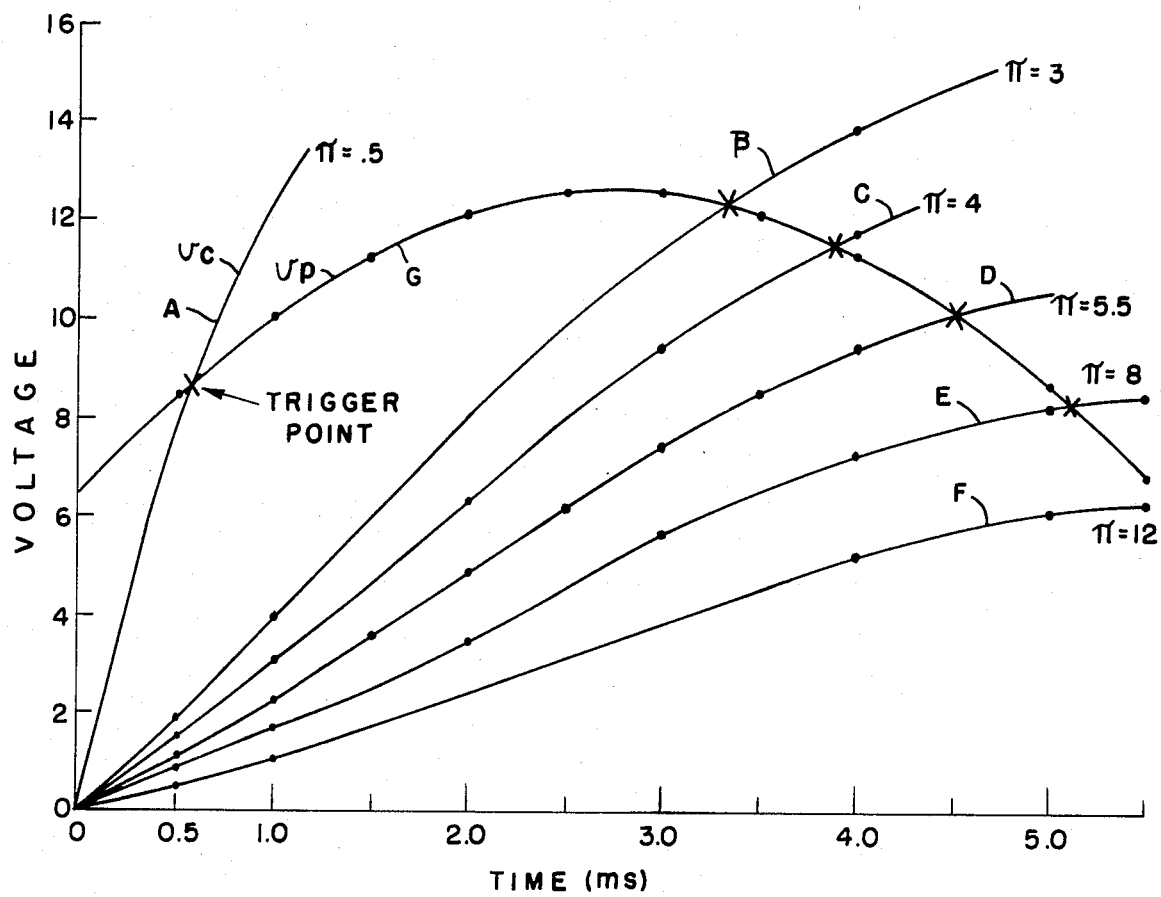

4,496,897

VARIABLE VOLTAGE CONTROL FOR SELF-EXCITED SELF-REGULATED SYNCHRONOUS ALTERNATOR

TECHNICAL FIELD

The present invention relates to synchronous alternators preferably of the self-excited self-regulated, brushless type, and, more particularly, to an adjustable voltage control for setting the nominal voltage of such alternators or the like.

BACKGROUND OF PRIOR ART

Various machines have been used for converting mechanical energy to an electrical output, such as those devices known by the terms generator, alternator, dynamo and the like. The invention of this application relates broadly to a voltage control for such machines and used in connection therewith.

One example of a dynamo electric machine of the self-excited self-regulated synchronous alternator type is disclosed in Sparrow U.S. Pat. No. 3,210,644. Such machine includes a main generator stator or armature and a rotating field winding. An exciter stator primary winding energized by an output from the main generator stator correspondingly produces a signal in a rotating exciter secondary. The exciter secondary in turn delivers a signal to the rotating field to produce a signal in the main generator stator which delivers an electrical output to a load. A rectifier for completing a circuit between the exciter secondary and the field rotates with the rotor.

One problem experienced in the part with self-excited, brushless, synchronous alternators, such as those of the type shown in the '644 patent is the variation in electrical output voltage magnitude occurring as the size of the electrical load or the current draw required from the machine varies.

It would be desirable, and it is, accordingly, an object of the present invention, to overcome the foregoing and other problems or disadvantages encountered in prior machines used for developing an electrical output in response to a mechanical input.

BRIEF SUMMARY OF THE INVENTION

With the foregoing in mind, a primary object of the present invention is to obtain and to control a field-adjustable nominal terminal voltage on an alternator and especially on a self-excited, self-regulated, brushless, synchronous alternator.

Another object is to deactivate a voltage adjust system under prescribed conditions, and especially to deactivate a voltage adjusting system of an alternator to achieve maximum exciter output voltage when there is a high alternator field demand. A corresponding object is to effect such deactivation automatically and especially in response to the actual field current demand.

An additional object is to enable adjustment or setting of output voltage of an alternator-exciter system without changing the winding configuration or arrangement; and especially to effect such setting adjustment under no-load and under relatively light-load conditions.

A further object is to enable a device of the alternator-exciter type, in which each of the alternator and exciter has a specific winding arrangement and specific number of turns per coil, to be used in applications requiring different nominal voltages.

Still another object is to provide an improved means of energizing and of controlling the alternator field winding of an alternator-exciter type device from the exciter secondary winding(s).

Still an additional object is to effect the aforesaid adjustments using a phase angle or phase delay control, and, moreover, to maintain substantially constant such phase angle or phase delay as the magnitude of the exciter output voltage varies.

Still a further object is to achieve the foregoing in rotating rectifier synchronous alternators.

Briefly, according to one aspect of the present invention, an electric generating device includes an alternator-exciter for producing an electrical output and an adjusting means for adjusting the output voltage of the alternator-exciter substantially independently of the winding arrangement thereof; or wherein the adjusting means provides for adjusting or setting the field excitation of the alternator-exciter to control the nominal terminal voltage of the electrical output; or wherein the adjusting means is of the type that adjusts or sets the output voltage of the alternator-exciter substantially independently of the winding arrangement and additionally a control is provided to control the no-load voltage of the electrical output.

According to another aspect of the invention an electric generating device includes an alternator-exciter for producing an electrical output, a circuit can be adjusted to set nominal voltage of the electrical output, and a deactivating device deactivates such circuit during operation of the device in a prescribed manner.

Several other aspects of the invention relate to improvements for alternator type electrical generating devices, including an adjusting device for adjusting the output voltage of the generating device substantially independently of the winding arrangement thereof; or a means for adjusting the field excitation of the device to set the nominal terminal voltage of the electrical output therefrom; or a means for setting the no-load voltage of the electrical output of the device; or a means for setting at least one parameter of the electrical output of the device and a deactivating means for deactivating the affect of such setting means during a prescribed manner of operation of the device.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 3 is a graphical representation of voltage, time, and trigger relationships that may be obtained in accordance with the present invention.

DESCRIPTION OF THE PREFERRED EMBODIMENT

Figure 1:
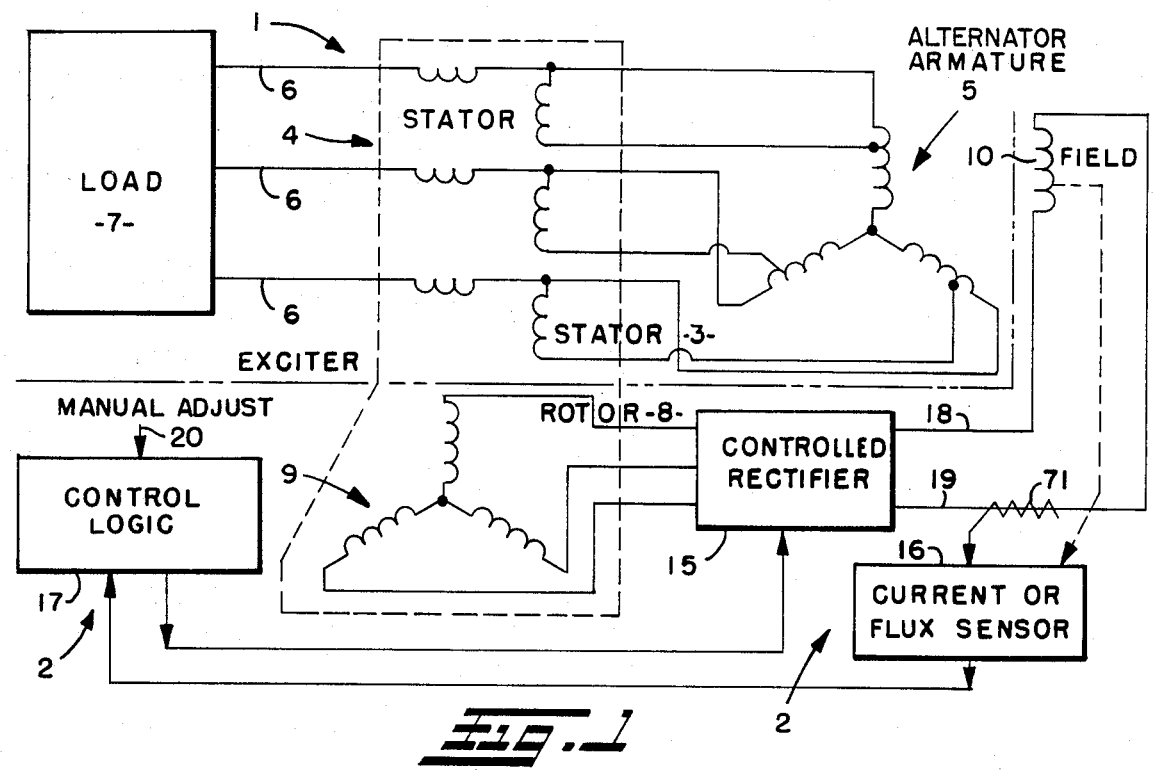
FIG. 1 is a schematic electric circuit diagram in block form of an alternator-exciter type of self-excited, self-regulated brushless, synchronous alternator including the adjustable control or nominal voltage setting circuitry of the present invention for effecting field-adjustable nominal terminal voltage for such alternator.

Referring now in detail to the drawings, wherein like reference numerals designate like parts in the several figures, and initially to FIG. 1, a self-excited, self-regulated, brushless, synchronous alternator is generally shown at 1 including adjustable nominal voltage setting or control circuitry 2 in accordance with the present invention. The alternator 1 includes a stator 3, which itself includes an exciter stator 4 and a main generator stator or alternator armature 5. The stator 3 is shown above the phantom line P in FIG. 1. Output leads 6 provide the electrical output from the alternator 1 to a load 7, such as an electric motor or other device that operates in response to input of electrical energy. The alternator 1 also includes a rotor 8, (shown on the opposite side of the phantom line P from the stator) which itself includes an exciter rotor 9 and the alternator field 10, which in the preferred embodiment is a winding or coil. The rotor 8 and stator 3 undergo relative rotation, and in the preferred embodiment the stator remains relatively fixed while the rotor rotates with respect thereto in response to a mechanical input, for example, from an engine or the like.

Included in the adjustable circuitry 2 are a controlled rectifier 15, the purpose of which is to effect phase modulation of the current to the field 10 in order to control the magnitude of the electrical output voltage on leads 6 as the current drawn by the load 7 varies, and especially during no-load or light-load conditions; a current or flux sensor 16, which monitors the current delivered to and/or the flux of the field 10, which will be representative of the effective draw of the load 7; and a controlled logic circuit 17, which effects the appropriate control of the controlled rectifier 15. The adjustable circuitry 2 provides a means for adjusting the no-load and light-load output voltage or terminal voltage, e.g. on leads 6, of the alternator 1 with a specific winding configuration, i.e., without having to alter the winding configuration of the alternator 1. Thus, a single alternator-exciter device, each alternator and exciter having a specific winding arrangement and a specific number of turns per winding or coil, can be used in applications requiring different nominal voltages. The adjustable circuitry 2 also includes provision, such as the sensor 16, for deactivating the voltage adjusting mechanism thereof during periods of high alternator field current demand so that full exciter output voltage can be applied to the alternator field to provide a maximum voltage output capability for the alternator armature 5.

The adjustable circuitry 2 may be used, for example, with alternators of the type manufactured and sold by the Lima Electric Co., Inc. of Lima, Ohio under the trademark MAC. For example, the alternator 1 of FIG. 1 may be one of such MAC alternators in which the alternator armature or stator 5 is a three phase wye-connected stator the alternator field 10 is a wound coil, the exciter stator 4 is a three phase set of series and shunt stator windings energized from the alternator armature 5, and the exciter rotor 9 is a three phase exciter rotor or secondary winding. Although the alternator 1 is shown as a three phase alternator, the adjustable circuitry 2 may be used equivalently with single phase machines or 2-phase machines and with machines that are greater than three phase. Using the adjustable circuitry 2 with one three phase MAC type alternator, for example, the nominal line voltage parameter can be adjusted from about 416 volts to about 520 volts.

Summarizing operation of the alternator 1, as the rotor 8 rotates, a DC current through the field 10 causes the latter to produce a flux, and that flux induces a signal in the individual coils of the alternator armature 5 whereupon an electrical output is produced on the leads 6. A portion of the electrical output, though, is coupled by the series and shunt windings of the exciter stator 4 to the windings of the exciter rotor 9. The exciter rotor 9, then, provides via the controlled rectifier 15 an electrical signal via leads 18, 19 to the field 10 energizing the same. An input 20 to the control logic 17 of the adjustable circuitry 2 provides manual adjustment of the nominal voltage or no load voltage to be produced across the respective leads 6 and controlled by the adjustable circuitry 2.

Figure 2:
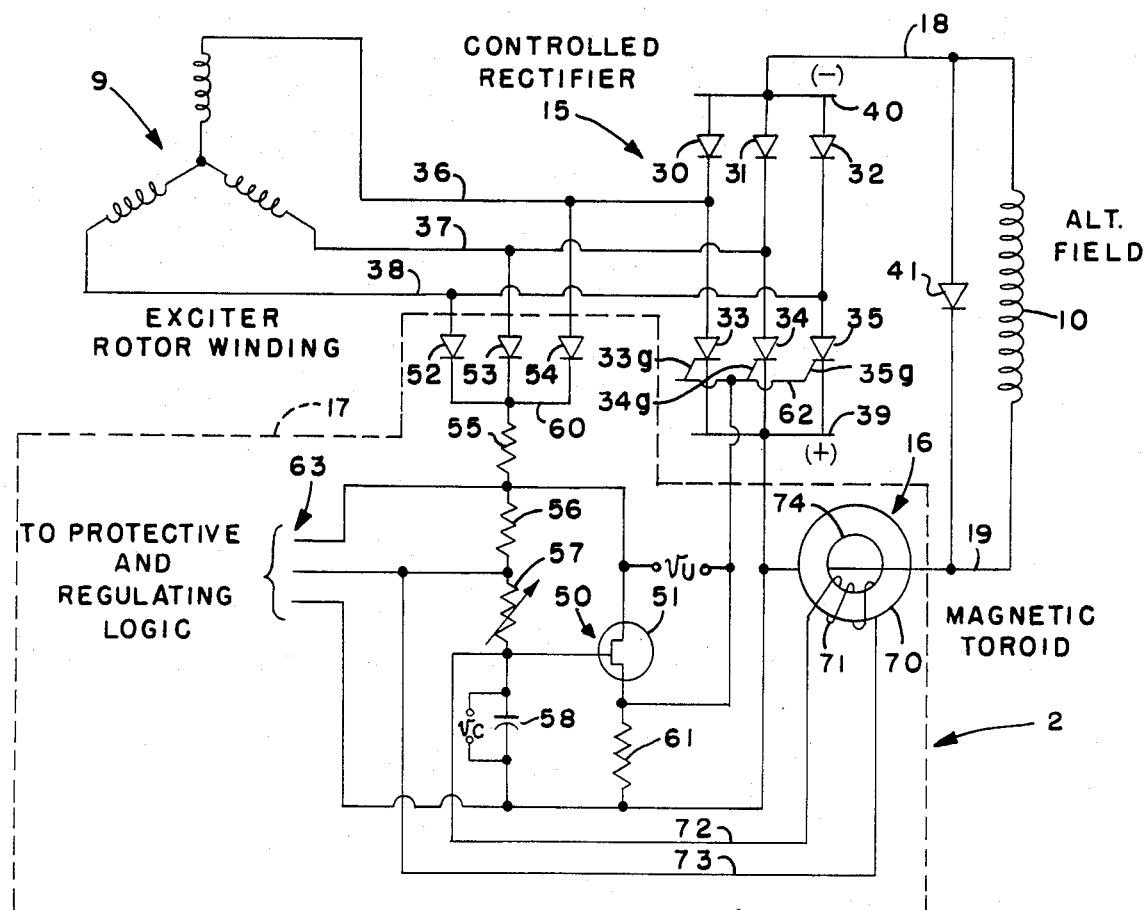
FIG. 2 is a schematic electric circuit diagram of the adjustable control circuitry of FIG. 1 coupled to the exciter rotor winding portion.

Referring now to FIG. 2, the adjustable circuitry 2 is shown in detail. Such circuitry 2 is intended to provide the means for effecting energizing the alternator field winding 10. In accordance with the present invention a conventional rectifier typically used in a rotating rectifier alternator is replaced with the controlled rectifier 15. The controlled rectifier 15 preferably is a so-called half-SCR bridge including diodes 30, 31, 32 and SCR's 33, 34, 35. If desired, though, a full-SCR bridge, transistor rectifiers, controlled rectifiers using other types of devices, and the like maybe used in place of the illustrated controlled rectifier 15. Leads 36, 37, 38 from the respective windings of the exciter rotor 9 couple the signal induced in such exciter rotor by the exciter stator 4 to the controlled rectifier 15, and it is the purpose of the latter to determine the level of energization of the alternator field 10 using a phase control technique, for example, employing signals to the gate electrodes 33g–35g of the SCR's. The controlled rectifier 15 is coupled between respective DC positive and negative busses 39, 40, which are, in turn, connected by leads 18, 19 across the alternator field 10. A free-wheeling diode 41 also may be coupled across the alternator field 10 for the usual purposes.

The control logic circuitry 17 controls the rectifier 15, and both the former and the latter are preferably of the illustrated type for simplicity, reliability, and reasonable price. The control logic circuitry 17 provides the desired phase control of the rectifier 15 being capable of delaying the turn-on or triggering of the SCR's 33–35 to vary the DC voltage output across the positive and negative busses 39, 40 from about 25% to about 95% of the voltage that would exist with a full diode bridge. Since 100% of the diode bridge voltage cannot be achieved with the illustrated controlled rectifier bridge 15, to achieve maximum rated output of the alternator 1, then, the number of turns in the respective windings of the exciter rotor or secondary 9 should be increased over the number such windings would include when the alternator is used with only a diode bridge. For example, such increase should be at least the ratio percentage 1 (representing the number of turns in the ordinary alternator exciter rotor) divided by the maximum capability of the controlled rectifier 15 as a percentage of the maximum voltage output capability of a standard diode bridge. Thus in the instant example, where the controlled bridge 15 has a maximum capability of 95% of the voltage that would exist with a full diode bridge, the number of turns in the exciter rotor windings should be increased to at least 100% divided by 95% or a total of 5% increase over the number of windings in the exciter rotor when there would be only a standard diode bridge in the alternator 1.

According to the invention, after the winding arrangement has been established, there would ordinarily be no need to change the number of turns on the pattern thereof to change the noted nominal voltage; rather it is the purpose of the adjustable circuitry 2 to provide adjustability of the setting control of such nominal voltage, as will be described further below. The preferred logic circuit and semi-conductor devices thereof will now be described in detail; however, it will be appreciated that other types of logic circuits and semi-conductor devices may be used to control turn-on of the SCR's 33–35.

In the control logic 17 a timing circuit 50 is used to trigger or to turn-on the SCR's 33–35 by controlling the delivery of gating signals to the gate terminals 33g–35g. The timing circuit 50 includes a unijunction transistor 51, but other types of triggering devices, such as, for example, transistors, low signal SCR's, diacs, silicon unilateral switches, programable unijunction transistors, etc. also may be used in the timing circuit 50. A particular advantage to the timing circuit 50 is that such circuit effects triggering of the SCR's 33–35 as a function of a voltage ratio and not in response to a fixed voltage so that the timing circuit 50 responds in an identical fashion to the varying voltage of the exciter rotor 9.

The exciter output voltages on leads 36–38 appear across the signal diodes 52, 53, 54. The cathodes of those diodes are connected together and via resistors 55, 56 and adjustable resistor or potentiometer 57 to a capacitor 58. The same voltages that appear across the main SCR's 33–35 of the controlled rectifier 15 appear across the signal diodes 52–54. For example, the voltage across signal diode 52 is the same as that across the SCR 35.

When the voltage across one of the signal diodes 52–54 becomes positive with respect to the DC positive bus 60, charging of the capacitor 58 is initiated via such signal diode and the resistors 55–57. This occurs three times in each cycle of the line exciter voltage, i.e. every 120 electrical degrees, since the alternator is a three phase machine. The capacitor 58 charges at a rate depending on the time constant $T_1$ of the series charging circuit; $T_1 = C (R1 + R2 + R3)$ seconds, where C is the capacitance of capacitor 58 and R1, R2, R3 are the resistances of resistors 55–57.

The unijunction transistor 51 ordinarily appears as an open circuit, and, therefore, the diode voltage just mentioned above appears cross the unijunction transistor. However, when the voltage across the capacitor 58 exceeds a prescibed fraction d of the voltage across the unijunction transistor, the latter is triggered to conduction almost instantly and appears as a short circuit. The capacitor 58 then discharges through the unijunction transistor 51 and through resistor 61 at a rate depending on the time constant; $T_1 = C (R4)$ seconds, where R4 is the resistance of resistor 61.

The voltage pulse occurring across resistor 61 during discharge of the capacitor 58 appears on the gate electrodes 33g–35g of the controlled rectifier SCR's 33–35. The SCR which is the most positively biased then will turn on and will remain on until it is negatively biased by the exciter line voltage appearing on the respective leads 36–38. The just-described operation will repeat at the beginning of the next 120 degree period when another signal diode voltage becomes positive as aforesaid.

The means for controlling the phase delay or time interval in each 120 degree period delaying the turn-on of the main SCR's 33–35 is the rate of charging of the capacitor 58. Manual setting of such charging rate may be effected by adjustment of the variable resistor 57. When the adjustable circuitry 2 initially is designed and constructed, the parameters of the unijunction transistor 51, namely the fraction or turn-on ratio d and the voltage rating thereof, and the values of the resistors 55–57 and of the capacitor 58 would influence the triggering point of the main SCR's 33–35. However, after an adjustable circuit 2 in accordance with the present invention has been built and assembled as part of an alternator 1, the voltage adjust control is provided substantially exclusively by the variable resistor 57.

In self-excited, self-regulated, brushless alternators, the exciter output voltage varies as a function of load current. Therefore, the voltage across the capacitor 58 and the voltage across the source terminals of the unijunction transistor will vary with exciter output voltage, namely that appearing on leads 36–38. The trigger point of the unijunction transistor 51, i.e. that point in the operation thereof at which the open circuit between the source electrodes becomes a closed circuit, is determined by a percentage (the turn-on ratio d) of the open circuit voltage across those source electrodes; the capacitor 58 must charge to that percentage voltage to trigger the unijunction transistor 51 to conduction. Since the unijunction transistor trigger point is determined by a percentage of the noted open circuit voltage rather than by a fixed value of voltage, and since the capacitor 58 and open circuit voltage of the unijunction transistor 51 vary with exciter output voltage, for a set value of resistors 55–57 the time relationships, i.e. the phase delay for triggering the respective main SCR's 33–35, will remain at least substantially the same as the exciter output voltage varies and, therefore, will be independent of real time. However, by adjusting the resistor 57 to change its resistance, the time constant or charging rate of the capacitor 58 will be changed; and, therefore, the time relationships or phase delay will be changed accordingly.

Referring briefly to FIG. 3, the triggering points for the unijunction transistor 51 for several values of the charging time constant $T_1$ e.g. which may be changed by adjusting the resistor of 57, are shown. The curves A through F represent the voltage $V_c$ across the capacitor 58 as such voltage varies as a function of time with respective time constants p1. For example, the time constant $T_1$ for curve A is 0.5, i.e. the product of the sum of the resistances 55, 56, 57 which may be a total of 1 Kohm and the capacitance of capacitor 58, which may be 0.5 microfarads. Curve G represents a tracking of the open circuit voltage $V_p$ across the source electrodes of the injunction transistor 51 and, accordingly, follows the full wave rectified voltage on the bus 60 from the leads 36–38 that carry exciter output voltages from the exciter rotor winding 9. Since the alternator 1 and adjustable control circuitry 2 described in detail herein is of the three phase type, the curve G will repeat in each 120 electric degrees of the exciter output voltages. Therefore, the following equation for the voltage $V_p$ may be written as is shown in FIG. 3; the value Vex may be, for example, 20.7 volts, which is the magnitude of the AC voltage produced by an individual winding of the exciter rotor 9 at a frequency of 60 Hz.

The trigger points or effective conduction angles, i.e. where conduction in the controlled bridge 15 begins in a 120 degree portion thereof, are indicated by cross marks at the intersections of respective curves A through F with curve G. When the trigger value is reached, the magnitude of the voltage $V_c$ across capacitor 58 equals the correct percentage of the open circuit voltage $V_p$ across the unijunction transistor 51, whereupon the latter fires to conduction causing a trigger pulse to be delivered to the bus 62 to which all the gate electrodes 33g–35g are connected. The time at which such firing/triggering occurs also is indicated in FIG. 3. That time, then, represents the phase delay for firing the respective SCR's 33–35 and, therefore, also represents the average voltage across the alternator field 10 for a given setting of the resistor 57. Moreover, the nominal, i.e. no-load or light-load voltage output of the alternator 1 applied on leads 6 will be a function of the thusly controlled voltage of the alternator field 10.

It may be necessary to supply additional conventional circuitry to protect the control logic 17 from abnormal exciter voltage levels, external noise signals, unijunction transistor trigger failure, and the like. Provisions for such additional circuitry are made by the connections 63 to protective and regulating logic circuitry (not shown and not necessary to a complete disclosure of the adjustable circuitry 2 of the instant invention.)

During a prescribed operational condition of the alternator 1, such as conditions of maximum field current demand, for example when the load 7 is an electric motor that is starting, it would be desirable to eliminate any phase delay that might have been introduced by the adjustable circuitry 2 to produce a certain no-load voltage. Elimination of such phase delay may be done manually by reducing the resistance value of the resistor 57 to its minimum value, say zero, which therefore minimizes the charging time constant $T_1$ for the capacitor 58. There will be minimum phase delay in turn-on of the SCR's 33–35 then and maximum available DC voltage would be applied to the alternator field 10. Since the resistor 57 preferably is located on the rotating member of the alternator-exciter system, any change in the setting of the resistor 57 during rotor rotation is virtually impossible, or, at least, uneconomical.

However, in accordance with the present invention a separate control means may be provided to alter the charging time constant $T_1$ for the capacitor 58 during specified conditions of operation of the adjustable circuitry 2, for example when large field current demand is required. The equivalent resistance between resistor 56 and capacitor 58 of the circuit shown in FIG. 2 can be changed by adding a controlled resistance in parallel with the actual resistor 57. There are various ways in which such controlled resistance may be added, for example by using a transistor, SCR or other semi-conductor device to short out resistor 57 as a function of the alternator field current magnitude. The shorting semiconductor could be turned on by means of a Hall device or Wiegand wire from a magnectic flux signal. Alternatively, such shorting semi-conductor could be turned on by means of a current sensor from a field current signal. According to the preferred embodiment and best mode of the present invention though, a saturable reactor approach is employed for automatically controlling the effective resistance between resistor 56 and capacitor 58. The saturable reactor approach is relatively uncomplicated and inexpensive while being satisfactorily effective.

Accordingly, the current or flux sensor 16 includes square-loop toroid 70 having a winding 71 with a relatively large number of turns connected electrically in parallel with the resistor 57. The winding 71, which is coupled by leads 72, 73 across resistor 57, presents a high inductive reactance to the signal diode (52–54) pulse voltages when the toroid 70 is unsaturated. However, the lead 19 passes through the center 74 or the toroid 70 so that at a certain value of alternator field current the toroid 70 becomes saturated; the inductance of the winding 71 then becomes negligible (with square-loop magnetic material) and effective low resistance is placed in parallel with resistor 57. For example, using a toroid 70 with an outer diameter of 1.75 inches and a thickness of 0.5 inch constructed of square-loop alloy such as Deltamax, a winding 71 of 650 turns provides an unsaturated inductive reactance of 10,000 Ohms, assuming an exciter output frequency of 120 Hz. Using number 28 AWG magnet wire, the coil or winding 71 will have a resistance of about 3 ohms, which will be the effective impedance in parallel with resistor 57, when the toroid 70 is saturated. Therefore, as high current tends to be drawn by the alternator field 10, the effective resistance between the resistor 56 and capacitor 58 will be reduced, usually substantially by a step function, and the charging rate of the capacitor 58 will be correspondingly increased in order to minimize any phase delay of the controlled rectifier 15. Therefore, maximum voltage will be applied from the exciter rotor 9 via the controlled rectifier 15 to the field 10 in an effort to try to supply the electrical output demanded by the load 7.

STATEMENT OF INDUSTRIAL APPLICATION

In view of the foregoing it will be appreciated that the invention may be used in connection with provision of electrical outputs from machines driven by mechanical inputs.

We claim:
1. An electric generating device comprising:
   an alternator-exciter means for producing an electrical output, said alternator-exciter means including an exciter rotor winding and a field winding,
   adjustable setting means for setting the nominal no load and light load output voltage of said alternator-exciter means substantially independently of the winding arrangement thereof, said adjustable setting means including a phase modulating circuit means for adjusting the voltage excitation of said field winding of said alternator-exciter means to determine the nominal terminal voltage of such electrical output and adjustable impedance means capable of being set to a prescribed value for determining the phase delay timing for said phase modulating circuit means in timed relation with such output voltage and substantially independently of the magnitude of such output voltage, said phase modulating circuit means comprising a controlled bridge and timing means for controlling operation of said controlled bridge in direct proportion to the open circuit voltage across at least part of said controlled bridge, said adjustable impedance means being coupled to said timing means to set the phase delay according to the proportion of such open circuit voltage required to effect conduction in said controlled bridge.

2. In an alternator type electrical generating device including an alternator-exciter means for producing an electrical output, said alternator-exciter means having an exciter rotor winding and a field winding, the improvement comprising:

adjustable setting means for setting the nominal no load and light load output voltage of such generating device substantially independently of the winding arrangement thereof, said adjustable setting means including a phase modulating circuit means for adjusting the excitation voltage of such field winding of such generating device to determine the nominal terminal voltage of the electrical output therefrom and adjustable impedance means capable of being set to a prescribed value for determining the phase delay timing for said phase modulating circuit means in timed relation with such output voltage and substantially independently of the magnitude of such output voltage, said phase modulating circuit means comprising a controlled bridge and timing means for controlling operation of said controlled bridge in direct proportion to the open circuit voltage across at least part of said controlled bridge, said adjustable impedance means being coupled to said timing means to set the phase delay according to the proportion of such open circuit voltage required to effect conduction in said controlled bridge.

3. The invention of claims 1 or 2, wherein the alternator-exciter means comprises a rototable rotor, and said adjustable impedance means is mounted with respect to said rotor for rotation therewith.

4. The invention of claims 1 or 2, wherein the alternator exciter means includes a rototable rotor, and at least part of said adjustable setting means is mounted for rotation with said rotor.

5. The invention of claim 4, wherein said adjustable impedance means comprises a variable resistor rotatable with said rotor and adjustabe to set such proportion of open circuit voltage.

6. The invention of claims 1 or 2, said controlled bridge comprising a half SCR bridge.

7. The invention of claim 4, further comprising means for causing said phase modulating circuit means to cause the alternator-exciter means to produce substantially maximum output voltage.

8. The invention of claim 7, wherein said means for causing comprises means for automatically responding to the magnitude of field winding current and said means for causing being positioned for rotation with said rotor.

9. The invention of claim 8, said means for causing comprising a toroid of electromagnetically responsive material and a toroid winding there around, said toroid being saturable in response to a prescribed field winding current causing the effective impedance of said toroid winding substantially to decrease, said toroid winding being coupled with respect to said phase modulating circuit means to minimize phase modulation of field winding current upon such toroid saturation.

10. The invention of claims 1 or 2, wherein said timing means includes means for responding to an electric signal parameter relationship to effect delivery of timing signals to control operation of said controlled bridge at least substantially independent of real time.

11. The invention of claims 1 or 2, said timing circuit means comprising a unijunction transistor timing circuit.

12. The invention of claims 1 or 2, further comprising deactivating means for deactivating said adjustable setting means during operation of the device in a prescribed manner, said deactivating means comprising a toroid of electromagnetically responsive material and an electric winding around at least a portion of said toroid, said phase moldulating circuit means including means for connecting an output thereof to said field winding to energize the latter, and wherein said means for connecting includes an electrical conductor positioned to pass through said toroid.

13. The invention of claim 12, wherein the exciter rotor winding and field winding are rotatable, and said electrical conductor and toroid are rotatable with said exciter rotor winding and field winding.

14. The invention of claims 1 or 2, said controlled bridge comprising a controlled bridge rectifier, and wherein the alternator-exciter means includes a rotatable rotor, and said controlled bridge rectifier is positioned for rotation with said rotor.

15. The invention of claims 1 or 2, further comprising deactivating means for deactivating said adjustable setting means by short circuiting said adjustable impedance means to effect maximum voltage output from the alternator-exciter means as a function of current in said field winding.

16. The invention of claim 15, wherein the alternator-exciter means includes a rotatable rotor including said exciter rotor winding and field winding, and said deactivating means is rotatable with said rotor.

* * * * *